US012682544B2

(12) United States Patent
Wang

(10) Patent No.: US 12,682,544 B2
(45) Date of Patent: Jul. 14, 2026

(54) SCENE RENDERING METHOD, ELECTRONIC DEVICE, AND NON-TRANSITORY READABLE STORAGE MEDIUM

(71) Applicant: Beijing Zitiao Network Technology Co., Ltd., Beijing (CN)

(72) Inventor: Pengfei Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 178 days.

(21) Appl. No.: 18/551,360

(22) PCT Filed: Mar. 8, 2022

(86) PCT No.: PCT/CN2022/079735
§ 371 (c)(1),
(2) Date: Sep. 19, 2023

(87) PCT Pub. No.: WO2022/227868
PCT Pub. Date: Nov. 3, 2022

(65) Prior Publication Data
US 2024/0193846 A1 Jun. 13, 2024

(30) Foreign Application Priority Data
Apr. 28, 2021 (CN) ......................... 202110469807.X

(51) Int. Cl.
*G06T 15/04* (2011.01)
*G06T 7/50* (2017.01)
(Continued)

(52) U.S. Cl.
CPC ................ *G06T 15/04* (2013.01); *G06T 7/50* (2017.01); *G06T 7/90* (2017.01); *G06V 10/56* (2022.01);
(Continued)

(58) Field of Classification Search
CPC .. G06T 15/04; G06T 7/50; G06T 7/90; G06T 2207/10024; G06T 15/00; G06V 10/56; G06V 10/764
See application file for complete search history.

(56) References Cited

U.S. PATENT DOCUMENTS 5,923,333 A 7/1999 Stroyan
6,271,848 B1 8/2001 Yasui et al.
(Continued)

FOREIGN PATENT DOCUMENTS

CN 101295408 A 10/2008
CN 101308581 A 11/2008
(Continued)

OTHER PUBLICATIONS

Lin Tangshan, "Research and Implementation of GPU-based Real-time Particle System Rendering Technology," Dissertation, South China University of Technology, Apr. 20, 2020, with English abstract (85 pages).
(Continued)

*Primary Examiner* — Daniel F Hajnik
*Assistant Examiner* — Thomas John Foster

(57) ABSTRACT
The present disclosure provides a scene rendering method, an electronic device and a storage medium, wherein the scene rendering method includes: acquiring an opaque object and a transparent object in a scene to be rendered; creating a first color texture with a first rendering resolution, and rendering the opaque object based on the first color texture to obtain a first rendering result; creating a second color texture with a second rendering resolution and copying the first rendering result onto the second color texture; rendering the transparent object based on the second color texture copied with the first rendering result, to obtain a second rendering result; performing first extraction on a color of the transparent object in the second rendering result,
(Continued)

to obtain a third rendering result; and synthesizing the third rendering result and the first rendering result to obtain a rendered scene image.

14 Claims, 8 Drawing Sheets

(51) Int. Cl.
*G06T 7/90* (2017.01)
*G06V 10/56* (2022.01)
*G06V 10/764* (2022.01)

(52) U.S. Cl.
CPC .. *G06V 10/764* (2022.01); *G06T 2207/10024* (2013.01)

(56) References Cited

U.S. PATENT DOCUMENTS

| | | | | |
|---|---|---|---|---|
| 8,149,243 B1* | 4/2012 | Kilgard | .................. | G06T 15/04 |
| | | | | 345/530 |
| 11,145,109 B1* | 10/2021 | Hillman | .................. | G06T 7/246 |
| 2011/0267363 A1* | 11/2011 | Miller | .................. | G06T 15/503 |
| | | | | 345/592 |
| 2014/0118368 A1 | 5/2014 | Fraser et al. | | |

FOREIGN PATENT DOCUMENTS

| | | | |
|---|---|---|---|
| CN | 103955957 A | 7/2014 |
| CN | 107590859 A | 1/2018 |
| CN | 109035383 A | 12/2018 |
| CN | 109741413 A | 5/2019 |
| CN | 110286979 A | 9/2019 |
| CN | 111292405 A | 6/2020 |
| CN | 111508053 A | 8/2020 |
| CN | 113205583 A | 8/2021 |
| CN | 113205583 B | 11/2024 |

OTHER PUBLICATIONS

International Search Report and Written Opinion for International Application No. PCT/CN2022/079735, mailed May 20, 2022, 17 Pages.
Notice of Allowance for Chinese Patent Application No. 202110469807.X dated Oct. 17, 2024, 4 pages.
Bhalerao et al., "Fast re-rendering of vol. and surface graphics by depth, color, and opacity buffering", Medical Image Analysis, vol. 4, No. 1, 2000, pp. 235-251.
Bojian, "Image-based Modeling and Rendering of Transparent Objects", Doctor of Philosophy in Computer Science, 2019, pp. 1-126.
Daiheng, "Order Independent Transparency in OpenGL", South China University of Technology, 2012, pp. 1-66.
Office action received from Chinese patent application No. 202110469807.X mailed on May 22, 2024, 14 pages (7 pages English Translation and 7 pages Original Copy).

* cited by examiner

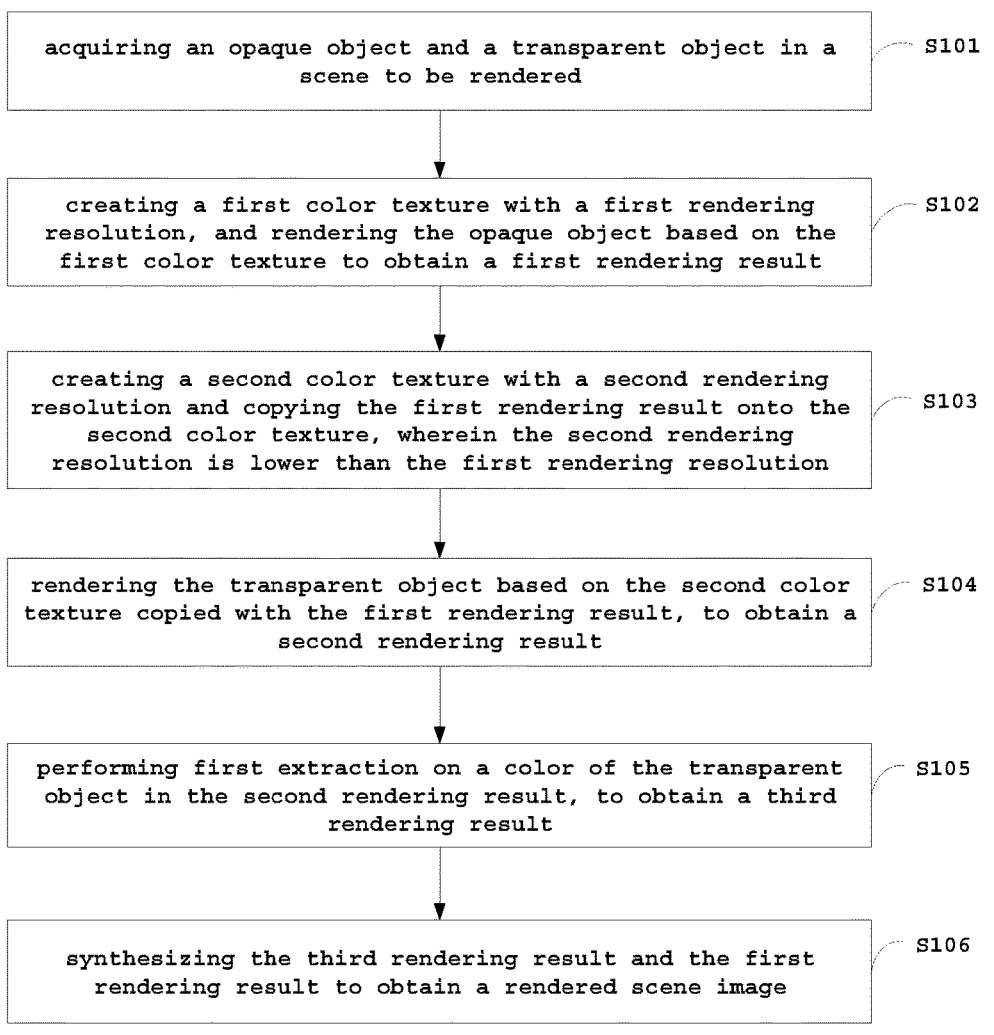

acquiring an opaque object and a transparent object in a scene to be rendered ⟋ S101 creating a first color texture with a first rendering resolution, and rendering the opaque object based on the first color texture to obtain a first rendering result ⟋ S102 creating a second color texture with a second rendering resolution and copying the first rendering result onto the second color texture, wherein the second rendering resolution is lower than the first rendering resolution ⟋ S103 rendering the transparent object based on the second color texture copied with the first rendering result, to obtain a second rendering result ⟋ S104 performing first extraction on a color of the transparent object in the second rendering result, to obtain a third rendering result ⟋ S105 synthesizing the third rendering result and the first rendering result to obtain a rendered scene image ⟋ S106

Fig.2 acquiring a scene description file of the scene to be rendered, and parsing the scene description file, to acquire an object to be rendered in the scene to be rendered and rendering information corresponding to the object to be rendered ⟋ S1011 classifying the objects to be rendered according to the rendering information into an opaque object and a transparent object ⟋ S1012

| creating a target map by taking the second rendering resolution as a reference, wherein color information of the target map corresponds to color information in the first rendering result | S1031 |

| rendering the target map based on the second color texture, and copying the color information in the first rendering result onto the second color texture | S1032 | determining first target depth information of the
transparent object and second target depth information in
the first rendering result, which respectively correspond
to target pixel points; the target pixel points being
pixel points to be rendered in the second color texture

S1041 comparing the first target depth information with the
second target depth information

S1042 in a case where a depth of the first target depth
information is greater than a depth of the second target
depth information, not rendering the target pixel points

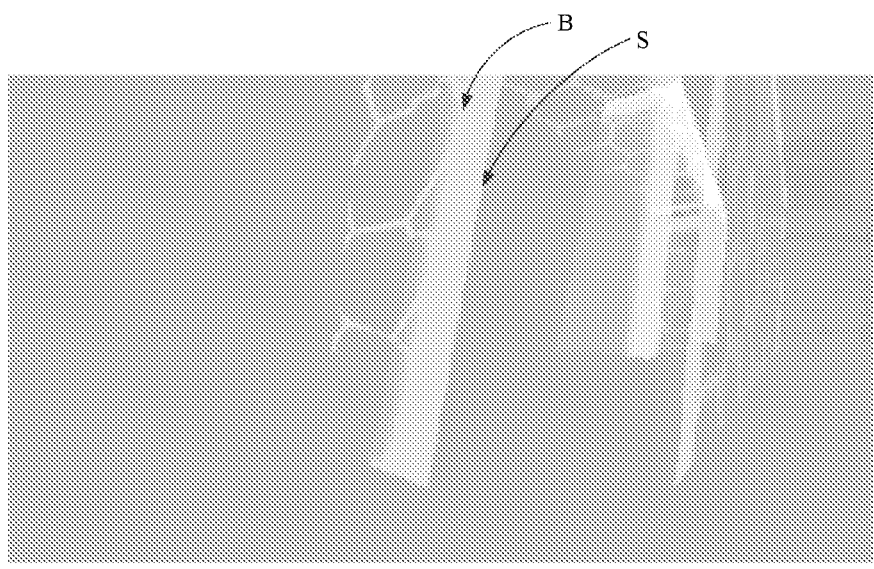
Fig.8
| processing an edge of the transparent object in the third rendering result by means of multiple sampling, to obtain a fourth rendering result | S1061 |
| synthesizing the fourth rendering result and the first rendering result to obtain the rendered scene image | S1062 |
Fig.9
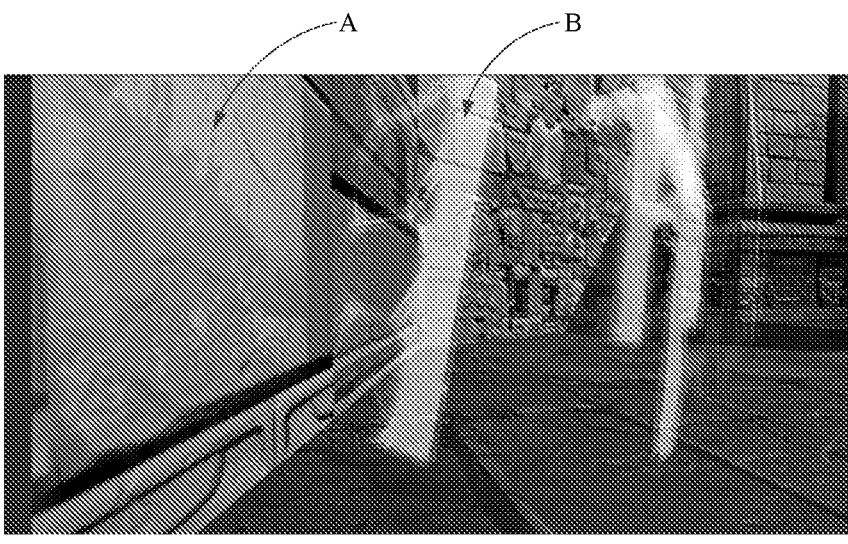
Fig.10

SCENE RENDERING METHOD, ELECTRONIC DEVICE, AND NON-TRANSITORY READABLE STORAGE MEDIUM

CROSS-REFERENCE TO RELATED APPLICATIONS

The present disclosure is a U.S. National Stage Application under 35 U.S.C. § 371 of International Patent Application PCT/CN2022/079735, filed on Nov. 3, 2022, which is based on and claims priority to the Chinese Patent Application No. 202110469807.X filed on Apr. 28, 2021, the disclosure of both of which are incorporated by reference herein in their entireties.

TECHNICAL FIELD

The present disclosure relates to the technical field of scene rendering, and in particular, to a scene rendering method and apparatus, an electronic device, and a storage medium.

BACKGROUND

In the technical field of scene rendering, a scene to be rendered comprises an opaque object and a semi-transparent object to be rendered, and an electronic device may first render the opaque object to be rendered and then render the semi-transparent object to be rendered.

SUMMARY

Embodiments of the present disclosure at least provide a scene rendering method and apparatus, an electronic device and a storage medium.

In a first aspect, some embodiments of the present disclosure provide a scene rendering method, comprising:

acquiring an opaque object and a transparent object in a scene to be rendered;

creating a first color texture with a first rendering resolution, and rendering the opaque object based on the first color texture to obtain a first rendering result;

creating a second color texture with a second rendering resolution and copying the first rendering result onto the second color texture, wherein the second rendering resolution is lower than the first rendering resolution;

rendering the transparent object based on the second color texture copied with the first rendering result, to obtain a second rendering result;

performing first extraction on a color of the transparent object in the second rendering result, to obtain a third rendering result; and synthesizing the third rendering result and the first rendering result to obtain a rendered scene image.

According to the first aspect, in some embodiments, the second rendering resolution is determined by at least one of a transparency of the transparent object or a number of laminations of the transparent object.

According to the first aspect, in some embodiments, the copying the first rendering result onto the second color texture comprises copying color information and depth information in the first rendering result onto the second color texture; and the rendering the transparent object based on the second color texture copied with the first rendering result comprises rendering the transparent object based on the second color texture copied with the first rendering result and the depth information of the transparent object.

According to the first aspect, in some embodiments, the rendering the transparent object based on the second color texture copied with the first rendering result and the depth information of the transparent object, comprises:

determining first target depth information of the transparent object and second target depth information in the first rendering result, which respectively correspond to target pixel points; the target pixel points being pixel points to be rendered in the second color texture;

comparing the first target depth information with the second target depth information; and in a case where a depth of the first target depth information is greater than a depth of the second target depth information not rendering the target pixel points.

According to the first aspect, in some embodiments, the copying the first rendering result onto the second color texture comprises:

creating a target map by taking the second rendering resolution as a reference, wherein color information of the target map corresponds to color information in the first rendering result; and rendering the target map based on the second color texture; and copying the color information in the first rendering result onto the second color texture.

According to the first aspect, in some embodiments, the performing first extraction on a color of the transparent object in the second rendering result, to obtain a third rendering result, comprises:

performing second extraction on the color of the transparent object in the second rendering result, to obtain color information of the transparent object;

performing first operation processing on the color information to obtain a processing result of the color information conforming to a target storage format, and obtaining the third rendering result, wherein the target storage format is a picture storage format;

the synthesizing the third rendering result and the first rendering result comprises:

performing second operation processing on the color information in the third rendering result, to obtain target color information, wherein the second operation is an inverse operation of the first operation; and synthesizing the target color information and the color information in the first rendering result.

According to the first aspect, in some embodiments, the synthesizing the third rendering result and the first rendering result to obtain a rendered scene image, comprises:

processing an edge of the transparent object in the third rendering result by means of multiple sampling, to obtain a fourth rendering result; and synthesizing the fourth rendering result and the first rendering result to obtain the rendered scene image.

According to the first aspect, in some embodiments, the acquiring an opaque object and a transparent object in a scene to be rendered comprises:

acquiring a scene description file of the scene to be rendered, and parsing the scene description file, to acquire objects to be rendered in the scene to be rendered and rendering information corresponding to the object to be rendered; and classifying the objects to be rendered according to the rendering information into an opaque object and a transparent object.

In a second aspect, some embodiments of the present disclosure provide a scene rendering apparatus, comprising:

an acquiring module configured to acquire an opaque object and a transparent object in a scene to be rendered;

a first rendering module configured to create a first color texture with a first rendering resolution, and render the opaque object based on the first color texture to obtain a first rendering result;

a copying module configured to create a second color texture with a second rendering resolution and copy the first rendering result onto the second color texture, wherein the second rendering resolution is lower than the first rendering resolution;

a second rendering module configured to render the transparent object based on the second color texture copied with the first rendering result, to obtain a second rendering result;

an extracting module configured to perform first extraction on a color of the transparent object in the second rendering result, to obtain a third rendering result;

a synthesizing module configured to synthesize the third rendering result and the first rendering result, to obtain a rendered scene image.

According to the second aspect, in some embodiments, the second rendering resolution is determined by at least one of a transparency of the transparent object or a number of laminations of the transparent object.

According to the second aspect, in some embodiments, the copying module is specifically configured to:

copy color information and depth information in the first rendering result onto the second color texture;

the second rendering module is specifically configured to:

render the transparent object based on the second color texture copied with the first rendering result and the depth information of the transparent object.

According to the second aspect, in some embodiments, the second rendering module is specifically configured to:

determine first target depth information of the transparent object and second target depth information in the first rendering result, which respectively correspond to target pixel points; the target pixel points being pixel points to be rendered in the second color texture;

compare the first target depth information with the second target depth information; and in a case where a depth of the first target depth information is greater than a depth of the second target depth information, not render the target pixel points.

According to the second aspect, in some embodiments, the second rendering module is specifically configured to:

create a target map by taking the second rendering resolution as a reference, wherein color information of the target map corresponds to color information in the first rendering result; and render the target map based on the second color texture, and copy the color information in the first rendering result onto the second color texture.

According to the second aspect, in some embodiments, the extracting module is specifically configured to:

perform second extraction on the color of the transparent object in the second rendering result, to obtain color information of the transparent object;

perform first operation processing on the color information to obtain a processing result of the color information conforming to a target storage format, and obtaining the third rendering result, wherein the target storage format is a picture storage format;

the synthesizing module is specifically configured to:

perform second operation processing on the color information in the third rendering result to obtain target color information, wherein the second operation is an inverse operation of the first operation; and synthesize the target color information and the color information in the first rendering result.

According to the second aspect, in some embodiments, the synthesizing module is specifically configured to:

process an edge of the transparent object in the third rendering result by means of multiple sampling to obtain a fourth rendering result; and synthesize the fourth rendering result and the first rendering result to obtain the rendered scene image.

According to the second aspect, in some embodiments, the acquiring module is specifically configured to:

acquire a scene description file of a scene to be rendered, and parse the scene description file to acquire objects to be rendered in the scene to be rendered and rendering information corresponding to the object to be rendered; and classify the object to be rendered according to the rendering information, and divide the object to be rendered into an opaque object and a transparent object.

In a third aspect, some embodiments of the present disclosure provide an electronic device, comprising: a processor, a memory and a bus, the memory storing machine-readable instructions executable by the processor, the processor and the memory communicating over the bus when the electronic device is running, the machine-readable instructions, when executed by the processor, performing the scene rendering method according to the first aspect.

In a fourth aspect, some embodiments of the present disclosure provide a computer-readable storage medium having a computer program stored thereon, which, when executed by a processor, performs the scene rendering method according to the first aspect.

In a fifth aspect, some embodiments of the present disclosure provide a computer program, comprising: instructions which, when executed by a processor, cause the processor to perform the scene rendering method according to the first aspect.

In a sixth aspect, some embodiments of the present disclosure provide a computer program product comprising instructions which, when executed by a processor, cause the processor to perform the scene rendering method according to the first aspect.

In order to make the aforementioned objects, features and advantages of the present disclosure more comprehensible, preferred embodiments are described in detail below in combination with the accompanying drawings.

BRIEF DESCRIPTION OF THE DRAWINGS

In order to more clearly illustrate the technical solutions of the embodiments of the present disclosure, the drawings required in the embodiments will be briefly described below, and the drawings herein incorporated in and forming a part of the specification illustrate the embodiments consistent with the present disclosure and, together with the description, serve to explain the technical solutions of the present disclosure. It is to be understood that the following drawings only show some embodiments of the disclosure and are therefore not to be considered as limitations to its scope, and those skilled in the art could obtain other related drawings from the drawings, without paying out creative efforts.

FIG. 2 shows a flow diagram of a scene rendering method provided in some embodiments of the present disclosure.

FIG. 3 shows a flow diagram of a method of acquiring an opaque object and a transparent object in a scene to be rendered, provided in some embodiments of the present disclosure.

FIG. 6 shows a flow diagram of a method of rendering a transparent object based on a second color texture, provided in some embodiments of the present disclosure.

FIG. 8 shows a schematic diagram of performing first extraction on a color of a transparent object in a second rendering result to obtain a third rendering result, provided in some embodiments of the present disclosure.

FIG. 9 shows a flow diagram of a method of synthesizing a third rendering result and a first rendering result, provided in some embodiments of the present disclosure.

FIG. 10 shows a schematic diagram of a rendered scene image provided in some embodiments of the present disclosure.

DETAILED DESCRIPTION

Figure 1:
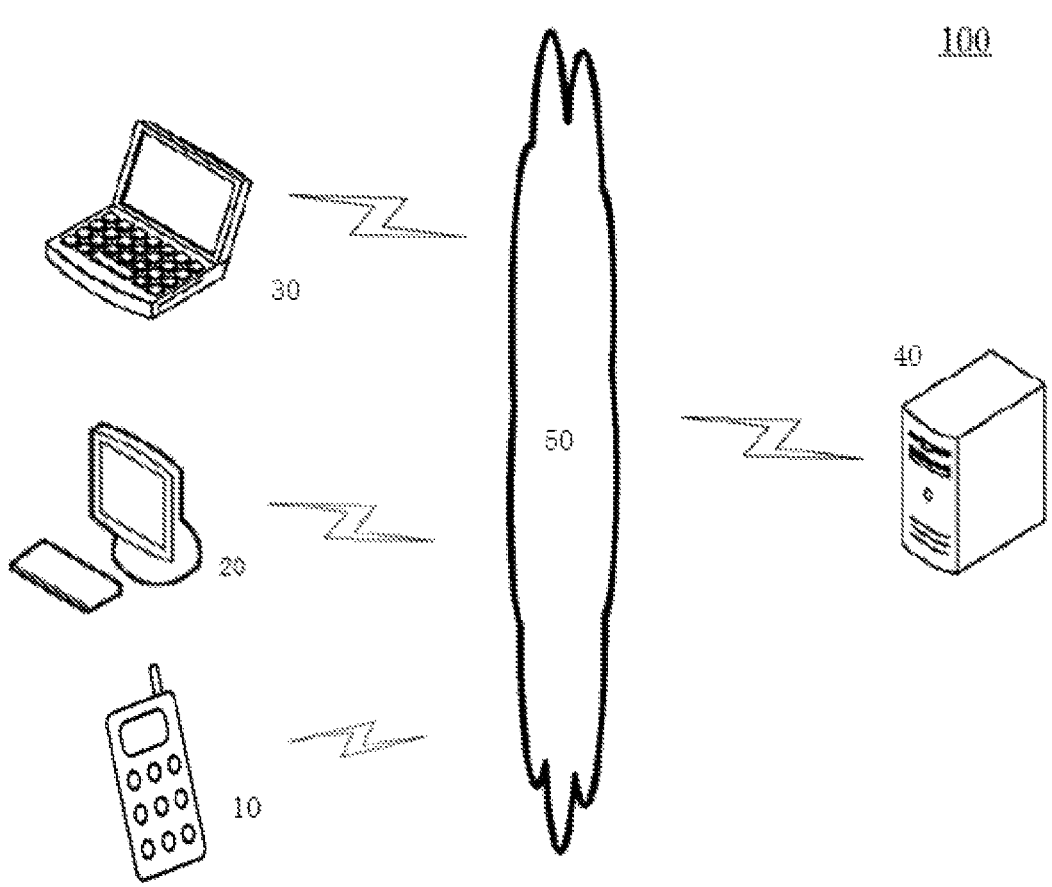
FIG. 1 shows a schematic diagram of an execution subject of a scene rendering method provided in some embodiments of the present disclosure.

To make the objectives, technical solutions and advantages of some embodiments of the present disclosure clearer, the technical solutions in some embodiments of the present disclosure will be described clearly and completely below with reference to the drawings in some embodiments of the present disclosure, and it is obvious that the described embodiments are only a part of some embodiments of the present disclosure, not all of the embodiments. The components of the embodiments of the present disclosure, as generally described and illustrated in the drawings herein, could be arranged and designed in a wide variety of different configurations. Thus, the following detailed description of the embodiments of the disclosure, provided in the accompanying drawings, is not intended to limit the scope of the present disclosure as claimed, but is merely representative of selected embodiments of the present disclosure. All some embodiments, which can be derived by a person skilled in the art from the embodiments of the disclosure without making any creative effort, shall fall within the protection scope of the present disclosure.

It should be noted that: like reference numbers and letters refer to like items in the following drawings, and thus, once an item is defined in one drawing, it need not be further defined or explained in subsequent drawings.

The term "and/or" herein merely describes an association, meaning that three relationships may exist, for example, A and/or B may mean the following three cases: A exists alone, A and B exist simultaneously, and B exists alone. In addition, the term "at least one" herein means any one of a plurality or any combination of at least two of a plurality, for example, "comprising at least one of A, B, C" may mean comprising any one or more elements selected from a group consisting of A, B and C.

In the technical field of scene rendering, a scene to be rendered comprises an opaque object and a semi-transparent object to be rendered, and an electronic device may first render the opaque object to be rendered and then render the semi-transparent object to be rendered.

It has been found that, in the rendering process, in order to reduce repeated drawing, only nearest opaque objects are usually rendered, however, the rendering method is not applicable to a transparent object. Because the transparent object (such as glass, firelight etc.), has a translucent effect, it is needed in the rendering process to render all overlapping transparent objects to perform color overlay and mixing, so as to guarantee a visual effect; as a result, the more number of times of rendering, the lower rendering efficiency of the electronic device.

The present disclosure provides a scene rendering method, comprising: acquiring an opaque object and a transparent object in a scene to be rendered; creating a first color texture with a first rendering resolution, and rendering the opaque object based on the first color texture to obtain a first rendering result; creating a second color texture with a second rendering resolution and copying the first rendering result onto the second color texture, wherein the second rendering resolution is lower than the first rendering resolution; rendering the transparent object based on the second color texture copied with the first rendering result, to obtain a second rendering result; performing first extraction on a color of the transparent object in the second rendering result, to obtain a third rendering result; and synthesizing the third rendering result and the first rendering result to obtain a rendered scene image.

In some embodiments of the disclosure, the opaque object and the transparent object are respectively rendered with different rendering resolutions, and the rendering resolution of the transparent object is lower than that of the opaque object, so that the rendering pressure can be reduced, and the rendering efficiency of the electronic device is improved. In addition, according to the scene rendering method in some embodiments of the disclosure, since only the rendering resolution of the transparent object is reduced, the original high-definition opaque object will not be blurred, and thus the visual experience of a user is ensured while the rendering efficiency is improved.

To facilitate understanding of the present embodiment, first, a scene rendering method disclosed in some embodiments of the present disclosure is described in detail; please refer to FIG. 1, which is a schematic diagram of an execution subject of the scene rendering method provided in some embodiments of the present disclosure; the execution subject of the scene rendering method provided in some embodiments of the present disclosure is generally an electronic device with certain computing capability, where the electronic device 100 comprises a terminal and a server. For example, the method may be applied to a terminal, and the terminal may be a smart phone 10, a desktop computer 20, a notebook computer 30, and the like shown in FIG. 1, and may also be a smart sound box, a smart watch, a tablet computer, and the like, which are not shown in FIG. 1, without limitation. The method may also be applied to ae server 40 or to an implementation environment consisting of the terminal and the server 40. The server 40 may be an independent physical server, a server cluster composed of a plurality of physical servers or a distributed system, or a cloud server providing basic cloud computing services such as cloud service, cloud database, cloud computing, cloud storage, big data, artificial intelligence platform, and the like.

In some embodiments, the electronic device 100 further comprises an AR (Augmented Reality) device, a VR (Virtual Reality) device, a MR (Mixed Reality) device, and the like. For example, the AR device may be a mobile phone or a tablet computer with an AR function, or may be AR glasses, which is not limited herein.

It is noted that in some embodiments, the server 40 may communicate with the smart phone 10, the desktop computer 20, and the notebook computer 30 over the network 50, respectively. The network 50 comprises various types of connections, such as wire, wireless communication links, or fiber optic cables, to name a few.

In addition, the scene rendering method may also be software running in the terminal or server, such as an application program having a function of presenting description information of a task. In some possible implementations, the scene rendering method may be implemented by a processor invoking computer readable instructions stored in a memory.

Refer to FIG. 2, which is a flow diagram of a scene rendering method provided in some embodiments of the present disclosure, where the scene rendering method comprises the following steps S101 to S106.

S101, acquiring an opaque object and a transparent object in a scene to be rendered.

It can be understood that before rendering a scene, opaque objects and transparent objects in the scene to be rendered need to be acquired to determine rendering targets. Illustratively, referring to FIG. 3, in some embodiments, the following S1011~S1012 are comprised for the step S101.

S1011, acquiring a scene description file of the scene to be rendered, and parsing the scene description file to acquire objects to be rendered in the scene to be rendered and rendering information corresponding to the object to be rendered.

S1012, classifying the objects to be rendered according to the rendering information into an opaque object and a transparent object.

Illustratively, a scene description file (such as an XML file) is loaded first, and the scene description file is parsed to acquire each rendering object in scene and rendering information thereof. The rendering information comprises a hierarchical organization structure: relation of the rendering object, position, geometric shape, material, texture information, rendering grouping information, material transparency and the like of the rendering object, and then the object to be rendered can be classified according to transparency information in the rendering information into an opaque object and a transparent object. The transparent object comprises a semi-transparent object and a fully transparent object.

In some embodiments, the electronic device may traverse the scene to be rendered, to obtain traversal result information traversing the scene to be rendered, wherein the traversal result information comprises: materials of all objects to be rendered in the scene to be rendered, and a rendering effect of each object to be rendered, etc.; the rendering effect of each object to be rendered comprises: a color value and transparency value required to be rendered for each object to be rendered, and the like. The scene to be rendered is a scene needing to be rendered.

The transparent object may be an object made of a transparent material, and the transparent material comprises a glass material, a plastic material, a rubber material, and the like. A range of the transparent value corresponding to the transparent object may be: [0, 255], or [0, 1], the transparency value corresponding to the transparent object may decide a rendering effect of the transparency degree of the transparent object, and the greater the transparency value corresponding to the transparent object is, the more opaque the rendering effect of the transparent object is.

In an implementation, the scene to be rendered may be a game scene, and when a user changes an angle and/or position for viewing the game scene, the game scene needs to be re-rendered. In one case, the user may change the angle and/or position for viewing the game scene by changing a position and/or viewing angle of a game character that he or she controls. It is understood that the scene to be rendered may be a stereo scene.

S102, creating a first color texture with a first rendering resolution, and rendering the opaque object based on the first color texture to obtain a first rendering result.

Figures 4, 5:
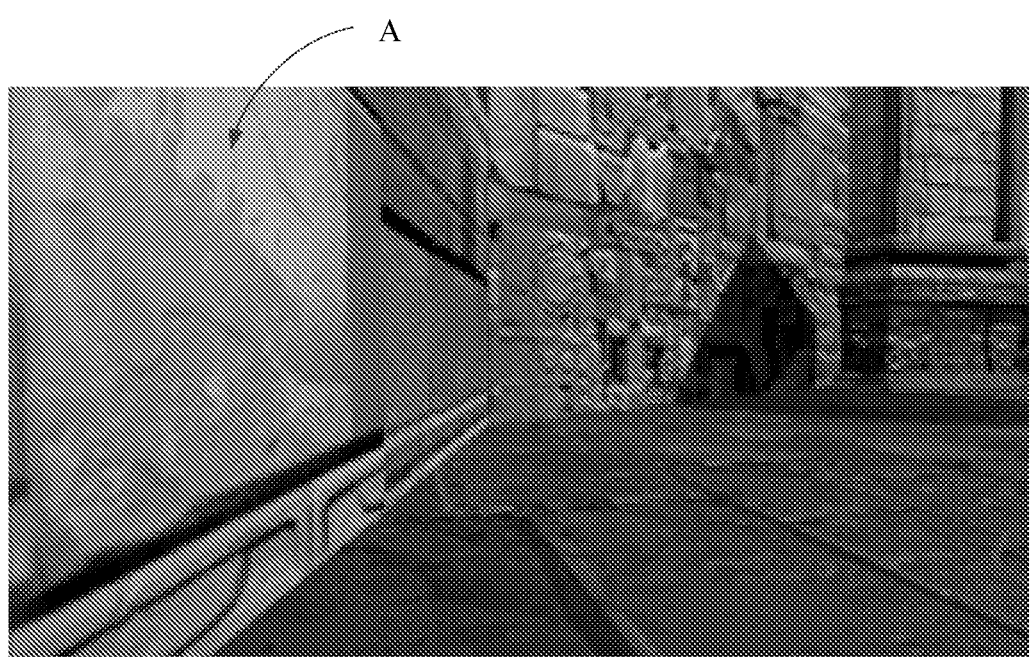
FIG. 4 shows a schematic diagram of rendering the opaque object to obtain a first rendering result, provided in some embodiments of the present disclosure.
FIG. 5 shows a flow diagram of a method of copying a first rendering result onto a second color texture, provided in some embodiments of the present disclosure.

For example, refer to FIG. 4, which is a schematic diagram of rendering the opaque object A to obtain a first rendering result, provided in some embodiments of the present disclosure, where the opaque object may be ranked according to an ascending order of coordinate values of the opaque object A in a z-axis direction in a visual coordinate system, and the opaque object is sequentially rendered according to the ranking, and a pixel point corresponding to the opaque object with a different z-coordinate value is rendered only once, wherein the coordinate value of the opaque object A in the z-axis direction in the visual coordinate system represents depth information of the opaque object A.

Specifically, rendering a pixel only once can be realized through depth detection, the depth detection is used to judge the rendering of the same position pixels, and objects nearest to the eyes are rendered first; in this way, it is guaranteed that rendering is performed only once for same position and different depths. A front layer is rendered first, and then a rear layer is drawn; because the front layer has already been filled with pixels, for the rear layer, a pixel replacement operation is not made in a region rendered in the front layer, that is, the region defined by the front layer, namely the overlapping region, is not rendered any more, and only a region of the rear layer which is not overlapped with the front layer is rendered, so that the number of updates of the same position pixels is reduced, and the rendering efficiency is improved.

S103, creating a second color texture with a second rendering resolution, and copying the first rendering result onto the second color texture, wherein the second rendering resolution is lower than the first rendering resolution.

Exemplarily, in order to subsequently perform correct transparent overlay and mixing, and ensure that a rendered color result of the transparent object is correct, after the opaque object is rendered, a second color texture may be created, a color value of the original opaque object is drawn into a color value of the second color texture, and the transparent object is rendered based on the rendering, thereby ensuring a rendering effect of the transparent object.

In this implementation, the second rendering resolution is lower than the first rendering resolution, for example, the second rendering resolution may be half or lower than the first rendering resolution, so that the rendering efficiency of the electronic device may be improved.

In some embodiments, the second rendering resolution is determined by at least one of a transparency of the transparent object or a number of laminations of the transparent object. For example, in a case where the transparency of the transparent object is higher, the second rendering resolution is lower; alternatively, in the case where the number of laminations of the transparent object is larger, the second rendering resolution is lower. Specifically, an association between the second rendering resolution and the transparency of the transparent object, or an association between the second rendering resolution and the number of laminations of the transparent object is not limited herein.

In some embodiments, since the second rendering resolution is determined by at least one of the transparency of the transparent object or the number of laminations of the transparent object, the second rendering resolution can be determined according to an actual situation of the transparent object in the rendering scene, so that the rendering efficiency of the electronic device can be further improved, while the rendering effect of the transparent object can be ensured.

In some embodiments, in order to improve a copying efficiency when copying the first rendering result onto the second color texture, referring to FIG. 5, with respect to the above step S103, when copying the first rendering result onto the second color texture, the following steps S1031 to S1032 are comprised.

S1031, creating a target map by taking the second rendering resolution as a reference, wherein color information of the target map corresponds to color information in the first rendering result.

S1032, rendering the target map based on the second color texture, and then copying the color information in the first rendering result onto the second color texture.

Exemplarily, creating the target map by using the second rendering resolution as a reference means rending a full-screen square patch; a resolution of the square patch is the second rendering resolution, and the color information of the square patch is the same as the color information in the first rendering result; then the square patch is used as a rendering target to be rendered on the second color texture, thereby copying the color information in the first rendering result onto the second color texture.

In some embodiments, the color information in the first rendering result is copied onto the second color texture by creating a target map and rendering the target map, and as compared with a method of drawing the color information of each pixel point one by one, the copying efficiency is improved.

That the color information of the target map corresponds to the first rendering result means that, a color value of each pixel point in the target map is an average of color values of a plurality of pixel points corresponding to a target proportion in the first rendering result, and the target proportion corresponds to a proportion between the first rendering resolution and the second rendering resolution. For example, in a case where the second rendering resolution is half of the first rendering resolution, a color average of a block of 2×2 pixels on the original first color texture is written into a pixel on the second color texture.

In some embodiments, in order to enable subsequent transparent objects to continue using a depth map of the opaque object, when copying the color information in the first rendering result onto the second color texture, the depth information in the first rendering result is also copied onto the second color texture, so that, for the aforementioned target map, a depth value of each pixel point in the target map is an average of depth values of a plurality of pixel points corresponding to the target proportion in the first rendering result.

And S104, rendering the transparent object based on the second color texture copied with the first rendering result, to obtain a second rendering result.

In some embodiments, since in the step S103, the color information and the depth information in the first rendering result are copied onto the second color texture, the step S104 may comprise: rendering the transparent object based on the second color texture copied with the first rendering result and the depth information of the transparent object. Specifically, the transparent object is rendered according to a preset depth rendering rule, where the depth rendering rule comprises a depth association rule between the opaque object and the transparent object, for example, the preset depth rendering rule may be that the transparent object is displayed one layer behind the opaque object, and may be specifically set according to an actual situation, which is not limited herein.

In some embodiments of the present disclosure, because the depth information in the first rendering result is also copied onto the second color texture, when a transparent object is rendered, the depth information of an opaque object can be referred to, and then the transparent object can be rendered according to a preset depth rendering rule, so that a corresponding rendering effect is achieved, different rendering requirements are met, and the applicability of the scene rendering method is improved.

Figure 6:
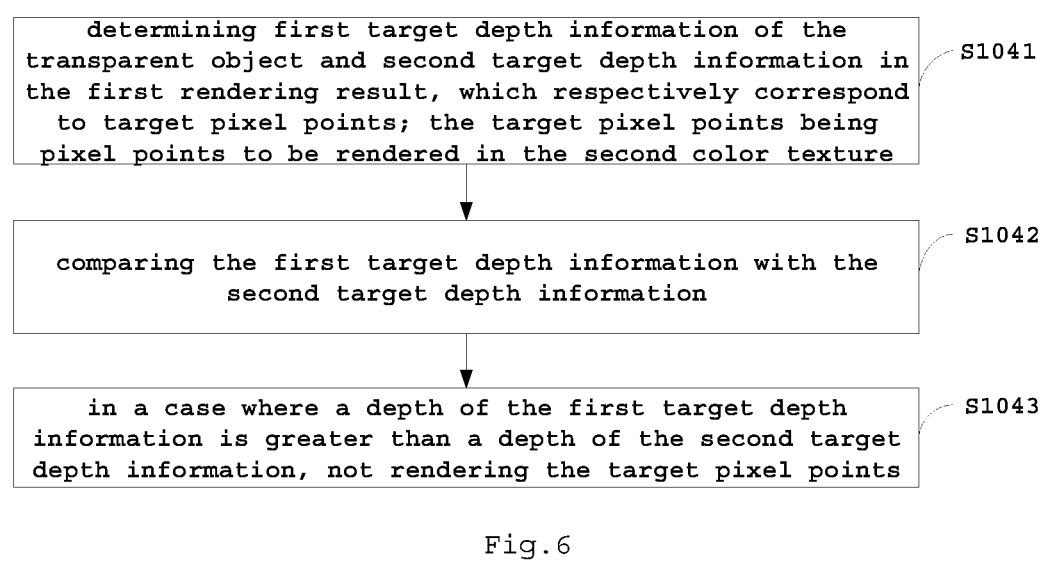

Exemplarily, referring to FIG. 6, with respect to the above step S104, when rendering the transparent object based on the second color texture copied with the first rendering result and the depth information of the transparent object, the following steps S1041 to S1043 are comprised.

S1041, determining first target depth information of the transparent object and second target depth information in the first rendering result, which correspond to target pixel points respectively; wherein the target pixel points are pixel points to be rendered in the second color texture.

S1042, comparing the first target depth information with the second target depth information.

S1043, in a case where a depth of the first target depth information is greater than a depth of the second target depth information, not rendering the target pixel points.

Figure 7:
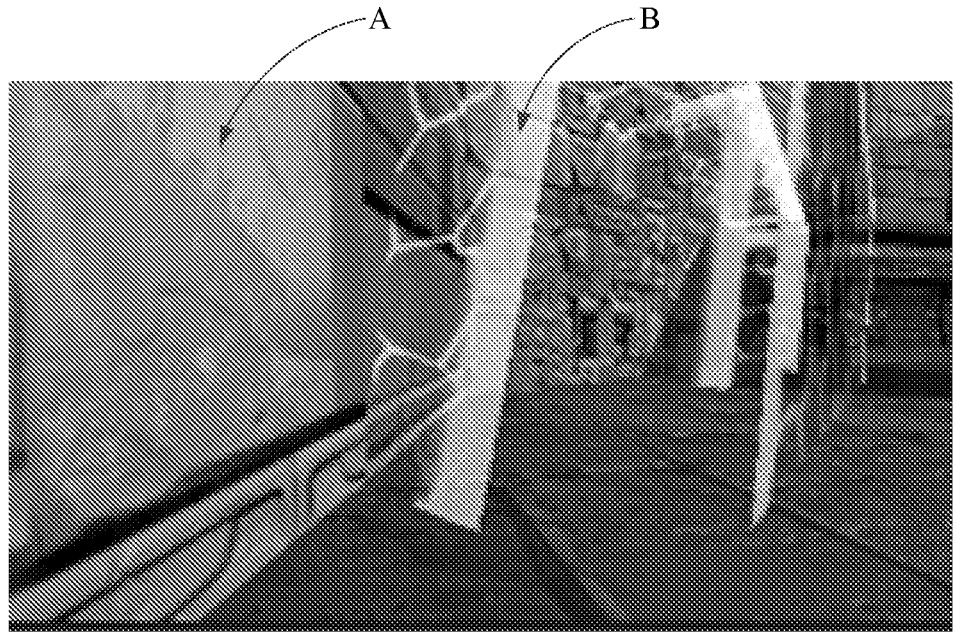
FIG. 7 shows a schematic diagram of rendering a transparent object to obtain a second rendering result, provided in some embodiments of the present disclosure.

Refer to FIG. 7, which is a schematic diagram of rendering a transparent object B to obtain a second rendering result, provided in some embodiments of the present disclosure, and as can be seen from FIG. 7, in some embodiments of the present disclosure, since the first target depth information and second target depth information which correspond to target pixel points respectively are compared, and the transparent object B is rendered according to a result of the comparison, a situation that the transparent object B blocked by the opaque object A is erroneously rendered can be avoided, and the rendering reliability is improved.

S105, performing first extraction on a color of the transparent object in the second rendering result to obtain a third rendering result.

It can be understood that, in a case where the second result is directly combined with the first result, an image of the opaque object in the first result is also blurred in a place where there is no transparent object or in a place behind the transparent object, and therefore, it is needed to perform first extraction on the color of the transparent object in the second rendering result to obtain a third rendering result comprising only color information of the transparent object, as is shown in FIG. 8, which is a schematic diagram of performing first extraction on the color of the transparent object B in the second rendering result to obtain a third rendering result, provided in some embodiments of the present disclosure.

S106, synthesizing the third rendering result and the first rendering result to obtain a rendered scene image.

Referring to FIG. 8 again, there is a problem of S-shaped sawtooth at an edge of the third rendering result. Therefore, in some embodiments, in order to solve the problem of S-shaped sawtooth of the edge caused by the third rendering result, referring to FIG. 9, with respect to the step S106, when the third rendering result and the first rendering result are synthesized, the following steps S1061 to S1062 are comprised.

S1061, processing an edge of the transparent object in the third rendering result by means of multiple sampling to obtain a fourth rendering result.

S1062, synthesizing the fourth rendering result and the first rendering result to obtain the rendered scene image.

Refer to FIG. 10, which is a schematic diagram of a rendered scene image provided in some embodiments of the present disclosure, and it can be seen from FIG. 10 that, in some embodiments, the edge of the transparent object B in the third rendering result is processed by means of multiple sampling to optimize the third rendering result, so as to obtain a fourth rendering result, and then the fourth rendering result and the first rendering result are synthesized, so that a sawtooth feeling of the edge of the transparent object in the third rendering result can be reduced, and the rendering quality can be improved.

It can be understood that, since three channels of color cannot store negative values (there is no negative color), and for some transparent objects (such as dark glass), the color in the second rendering result will be darker, that is, the color value may be less than 0, and if it is not processed, it will be automatically processed to be 0 after the second extraction, thereby causing an error in the color stripped from the second rendering result; therefore, in some embodiments, with respect to the step S105, when performing first extraction on the color of the transparent object in the second rendering result, the following steps (a)-(b) are comprised.

(a) Performing second extraction on the color of the transparent object in the second rendering result to obtain color information of the transparent object.

(b) Performing first operation processing on the color information to obtain a processing result of the color information conforming to a target storage format, and obtaining the third rendering result, wherein the target storage format is a picture storage format.

In some embodiments, after the step (a), the color information is further subjected to first operation processing, to obtain a processing result of the color information conforming to a target storage format, and the third rendering result is obtained. In some embodiments, the first operation processing may include a gamut remapping algorithm.

Exemplarily, Equation (1) for the first operation processing is as follows:

$$deltColor=(deltColor+1)/2 \qquad (1)$$

DeltColor represents a color value of each pixel point.

Since the extracted color values are processed in the step S105 to enable the color values to be stored, in order to ensure the color display effect of the transparent object in the second rendering result, the following steps (c)-(d) are comprised in the synthesizing in the step S106.

(c) Performing second operation processing on the color information in the third rendering result to obtain target color information, wherein the second operation is an inverse operation of the first operation;

(d) Synthesizing the target color information and the color information in the first rendering result.

Therefore, not only the color information of the transparent object extracted from the second rendering result can be stored in a picture format, but also the synthesized target color information can be consistent with the color of the transparent object in the second rendering result, which improves the visual effect of the rendering.

Exemplarily, Equation (2) for the second operation is as follows.

$$finalColor=originColor+deltColor\times2-1 \qquad (2)$$

DeltColor represents a color value of each extracted pixel point, originColor represents a color value of each pixel point in the first rendering result, and finalColor represents a color value of each synthesized pixel point.

In some embodiments of the invention, the opaque object and the transparent object are respectively rendered with different rendering resolutions, and the rendering resolution of the transparent object is lower than that of the opaque object, so that the rendering pressure can be reduced, and the rendering efficiency of the electronic device is improved. Particularly in a scene that, in shooting and fighting games of free-view, a great amount of transparent special effects such as light, fog, magic and the like will be generated when battle conditions are intense, resulting in sharp increase of the rendering pressure, the effect of improving the rendering efficiency by adopting the scene rendering method is obvious, the game performance can be greatly improved, and game fluency can be kept.

In addition, according to the scene rendering method in some embodiments of the present disclosure, since only the rendering resolution of the transparent object is reduced, the original high-definition opaque object will not be blurred, and thus the visual experience of the user is ensured while the rendering efficiency is improved.

It will be understood by those skilled in the art that in the above methods of the specific implementations, the order of the steps does not imply a strict order of execution and does not impose any limitation on some embodiments s, as the order of execution of the steps should be determined by their functions and possibly inherent logic.

Based on the same technical concept, a scene rendering apparatus corresponding to the scene rendering method is further provided in some embodiments of the present disclosure, and as the principle of solving the problem of the apparatus in some embodiments of the present disclosure is similar to that of the scene rendering method in some embodiments of the present disclosure, some embodiments of the apparatus may refer to some embodiments of the method, and repeated parts are not described again.

Figure 11:
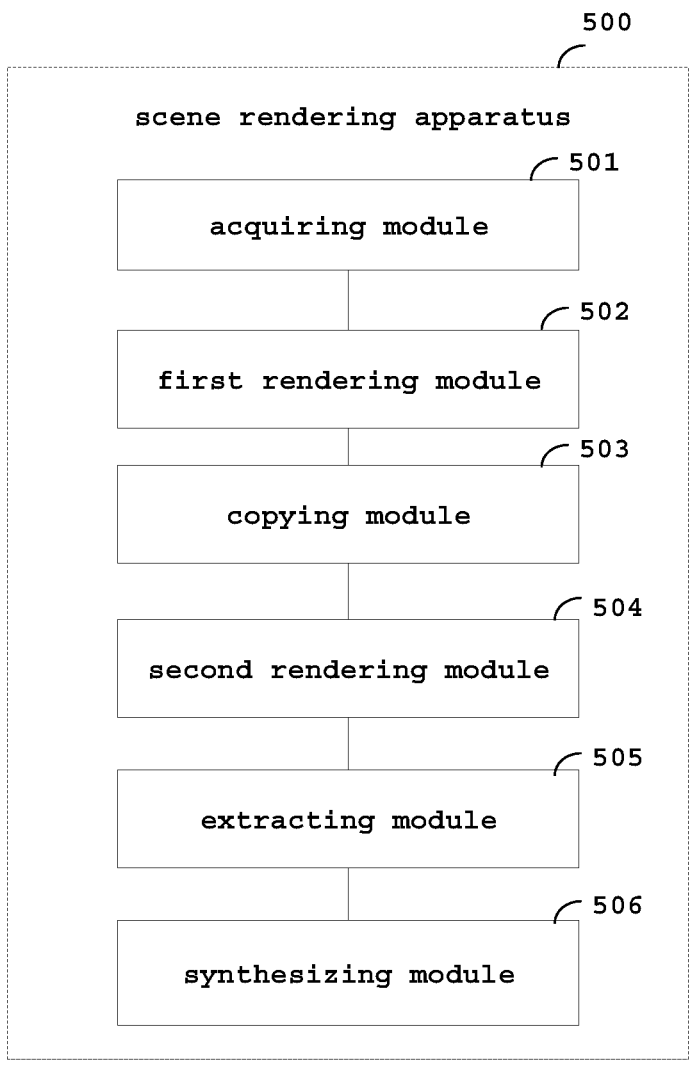
FIG. 11 shows a schematic structural diagram of a scene rendering apparatus provided in some embodiments of the present disclosure.

Refer to FIG. 11, which is a schematic diagram of a scene rendering apparatus 500 provided in some embodiments of the present disclosure, the apparatus comprising:

an acquiring module 501, configured to acquire an opaque object and a transparent object in a scene to be rendered;

a first rendering module 502, configured to create a first color texture with a first rendering resolution, and render the opaque object based on the first color texture to obtain a first rendering result;

a copying module 503, configured to create a second color texture with a second rendering resolution, and copy the first rendering result onto the second color texture, wherein the second rendering resolution is lower than the first rendering resolution;

a second rendering module 504, configured to render the transparent object based on the second color texture copied with the first rendering result, to obtain a second rendering result;

an extracting module 505, configured to perform first extraction on a color of the transparent object in the second rendering result, to obtain a third rendering result;

a synthesizing module 506, configured to synthesize the third rendering result and the first rendering result to obtain a rendered scene image.

In some embodiments, the second rendering resolution is determined by at least one of a transparency of the transparent object or a number of laminations of the transparent object.

In some embodiments, the copying module 503 is specifically configured to:

copy color information and depth information in the first rendering result onto the second color texture;

the second rendering module 504 is specifically configured to:

render the transparent object based on the second color texture copied with the first rendering result and the depth information of the transparent object.

In some embodiments, the second rendering module 504 is specifically configured to:

determine first target depth information of the transparent object and second target depth information in the first rendering result, which respectively correspond to target pixel points; wherein the target pixel points are pixel points to be rendered in the second color texture;

compare the first target depth information with the second target depth information;

in a case where a depth of the first target depth information is greater than a depth of the second target depth information, not render the target pixel points.

In some embodiments, the second rendering module 504 is specifically configured to:

create a target map by taking the second rendering resolution as a reference, wherein color information of the target map corresponds to color information in the first rendering result; and render the target map based on the second color texture, and copy the color information in the first rendering result onto the second color texture.

In some embodiments, the extracting module 505 is specifically configured to:

perform second extraction on the color of the transparent object in the second rendering result to obtain color information of the transparent object;

perform first operation processing on the color information to obtain a processing result of the color information conforming to a target storage format, and obtaining the third rendering result, wherein the target storage format is a picture storage format;

the synthesizing module 506 is specifically configured to:

perform second operation processing on the color information in the third rendering result to obtain target color information, wherein the second operation is an inverse operation of the first operation;

synthesize the target color information and the color information in the first rendering result.

In some embodiments, the synthesizing module 506 is specifically configured to:

process an edge of the transparent object in the third rendering result by means of multiple sampling, to obtain a fourth rendering result; and synthesize the fourth rendering result and the first rendering result to obtain the rendered scene image.

In some embodiments, the acquiring module 501 is specifically configured to:

acquire a scene description file of the scene to be rendered, and parse the scene description file, to acquire an object to be rendered in the scene to be rendered and rendering information corresponding to the object to be rendered; and classify the object to be rendered according to the rendering information, and divide the object to be rendered into an opaque object and a transparent object.

The description of the processing flow of each module in the apparatus and the interaction flow between the modules may refer to the relevant description in the above method embodiments, and will not be described in detail here.

The modules described above may be implemented as software components executing on one or more general-purpose processors, or as hardware such as a programmable logic device and/or application specific integrated circuit that performs certain functions, or combinations thereof. In some embodiments, these modules may be embodied in the form of a software product that may be stored in a non-volatile storage medium comprising instructions that cause a computer device (e.g., a personal computer, server, network device, mobile terminal, etc.) to implement the methods described in the embodiments of the present invention. In some embodiments, the modules may be implemented on a single device or may be distributed across multiple devices. The functions of these modules may be combined with each other, or may be further divided into a plurality of sub-units.

Figure 12:
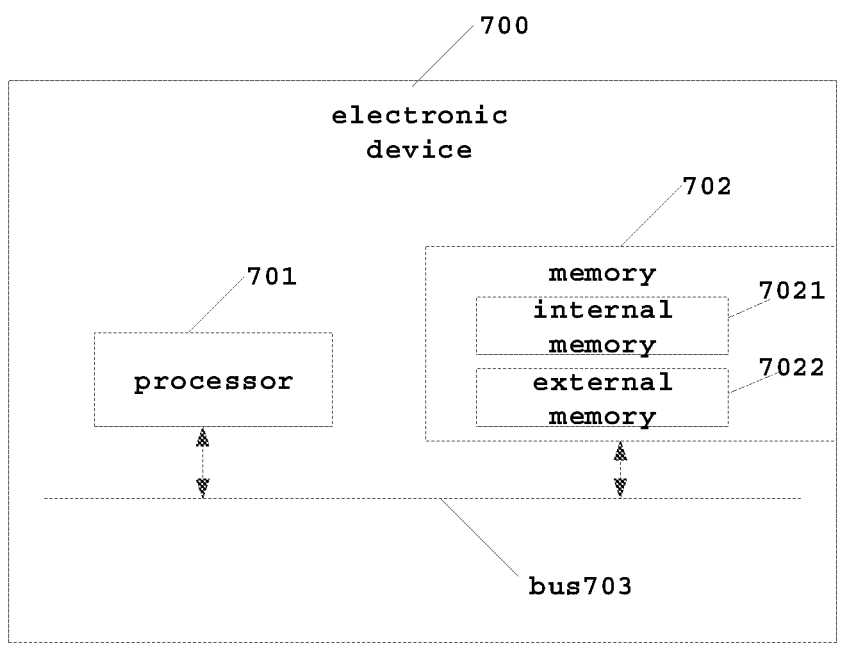
FIG. 12 shows a schematic diagram of an electronic device provided in some embodiments of the disclosure.

Based on the same technical concept, some embodiments of the disclosure also provide an electronic device. Refer to FIG. 12, which is a schematic structural diagram of an electronic device 700 provided in some embodiments of the present disclosure, comprising a processor 701, a memory 702, and a bus 703. The memory 702 is configured to store execution instructions and comprises an internal memory 7021 and an external memory 7022; the internal memory 7021 here is also referred to as an internal memory for temporarily storing operation data in the processor 701 and data exchanged with the external memory 7022 such as a hard disk, and the processor 701 exchanges data with the external memory 7022 via the internal memory 7021.

In some embodiments of the present application, the memory 702 is specifically configured to store application program code for executing the solution of the present application, and is controlled and executed by the processor 701. That is, when the electronic device 700 is running, the processor 701 communicates with the memory 702 via the bus 703, so that the processor 701 executes the application program code stored in the memory 702, thereby executing the method described in any of the previous embodiments.

The memory 702 may be, but is not limited to, a Random Access Memory (RAM), a Read Only Memory (ROM), a Programmable Read-Only Memory (PROM), an Erasable Programmable Read-Only Memory (EPROM), an electric Erasable Programmable Read-Only Memory (EEPROM), and the like.

The processor 701 may be an integrated circuit chip having signal processing capabilities. The processor may be a general purpose processor, comprising a Central Processing Unit (CPU), a Network Processor (NP), and the like; and may also be a Digital Signal Processor (DSP), an Application Specific Integrated Circuit (ASIC), a Field Programmable Gate Array (FPGA) or other programmable logic devices, discrete gates or transistor logic, discrete hardware components. The various methods, steps, and logic blocks disclosed in the embodiments of the present invention may be implemented or performed. The general purpose processor may be a microprocessor or the processor may be any conventional processor or the like.

It is to be understood that the structure illustrated in some embodiments of the present application does not specifically limit the electronic device 700. In some embodiments of the present application, the electronic device 700 comprises more or fewer components than illustrated, or combine certain components, or split certain components, or arrange different components. The illustrated components may be implemented in hardware, software, or a combination of software and hardware.

An embodiment of the present disclosure further provides a computer-readable storage medium having a computer program stored thereon, which, when executed by a processor, performs the steps of the scene rendering method in the foregoing method embodiments. The storage medium may be a volatile or non-volatile computer-readable storage medium.

An embodiment of the present disclosure further provides a computer program product carrying program code, wherein instructions comprised in the program code may be used to perform the steps of the scene rendering method in the foregoing method embodiments, which may be specifically referred to in the foregoing method embodiments, and are not described herein again.

The computer program product may be implemented specifically in hardware, software or a combination thereof. In an alternative embodiment, the computer program product is embodied in a computer storage medium, and in another alternative embodiment, the computer program product is embodied in a software product, such as a Software Development Kit (SDK) or the like.

An embodiment of the present disclosure further provides a computer program, comprising: instructions which, when executed by a processor, cause the processor to perform the scene rendering method according to the first aspect.

An embodiment of the present disclosure further provides a computer program product comprising instructions which, when executed by a processor, cause the processor to perform the scene rendering method according to the first aspect.

It can be clearly understood by those skilled in the art that, for convenience and simplicity of description, the specific working process of the system and the apparatus described above may refer to the corresponding process in the foregoing method embodiment, and details are not described herein again. In the several embodiments provided in the present disclosure, it should be understood that the disclosed system, apparatus and method may be implemented in other ways. The above-described apparatus embodiments are merely illustrative; for example, the division of the units is only a logical function division, and other divisions may exist in actual implementations; for another example, multiple units or components may be combined or integrated into another system, or some features may be omitted, or not performed. In addition, the shown or discussed coupling or direct coupling or communication connection between each other may be through some communication interfaces, indirect coupling or communication connection between devices or units, and may be in an electrical, mechanical or other forms.

The units described as separate parts may or may not be physically separate, and parts displayed as units may or may not be physical units, may be located in one position, or may be distributed over multiple network units. Some or all of the units can be selected according to actual needs to achieve the purpose of the solution of the embodiment.

In addition, functional units in the embodiments of the present disclosure may be integrated into one processing unit, or each unit may exist alone physically, or two or more units are integrated into one unit.

The functions, if implemented in software functional units and sold or used as a stand-alone product, may be stored in a non-transitory computer-readable storage medium executable by a processor. Based on such understanding, the technical solutions of the present disclosure in essence, or part of the technical solutions contributing to the prior art, or part of the technical solutions, may be embodied in the form of a software product, which is stored in a storage medium and comprises several instructions for causing a computer device (which may be a personal computer, a server, or a network device) to perform all or part of the steps of the methods described in the embodiments of the present disclosure. The aforementioned storage medium comprises: a U-disk, a removable hard disk, a Read-Only Memory (ROM), a Random Access Memory (RAM), a magnetic disk, an optical disk, or other various media capable of storing program code.

Finally, it should be noted that: the above-mentioned embodiments are merely specific embodiments of the present disclosure, for illustrating the technical solutions of the present disclosure, but not limiting the technical solutions, and the scope of the present disclosure is not limited thereto; although the present disclosure is described in detail with reference to the foregoing embodiments, those of ordinary skill in the art should understand that: those skilled in the art can still make modifications or changes to the technical solutions recited in the foregoing embodiments, or make equivalent substitutions for some of the technical features, within the technical scope of the present disclosure; such modifications, changes or substitutions do not depart from the spirit and scope of the embodiments disclosed herein, and they should be construed as being included therein. Therefore, the protection scope of the present disclosure shall be subject to the protection scope of the claims.

What is claimed is:

1. A scene rendering method, comprising:

acquiring an opaque object and a transparent object in a scene to be rendered;

creating a first color texture with a first rendering resolution, and rendering the opaque object based on the first color texture to obtain a first rendering result;

creating a second color texture with a second rendering resolution and copying the first rendering result onto the second color texture, wherein the second rendering resolution is lower than the first rendering resolution, and the second rendering resolution is determined by at least one of a transparency of the transparent object or a number of laminations of the transparent object;

rendering the transparent object based on the second color texture copied with the first rendering result, to obtain a second rendering result;

performing first extraction on a color of the transparent object in the second rendering result, to obtain a third rendering result; and synthesizing the third rendering result and the first rendering result to obtain a rendered scene image, wherein the higher the transparency of the transparent object is, the lower the second rendering resolution is.

2. The scene rendering method according to claim 1, wherein:

the copying the first rendering result onto the second color texture comprises copying color information and depth information in the first rendering result onto the second color texture; and the rendering the transparent object based on the second color texture copied with the first rendering result comprises rendering the transparent object based on the second color texture copied with the first rendering result and the depth information of the transparent object.

3. The scene rendering method according to claim 2, wherein the rendering the transparent object based on the second color texture copied with the first rendering result and the depth information of the transparent object, comprises:

rendering the transparent object according to a preset depth rendering rule, wherein the depth rendering rule comprises a depth association rule between the opaque object and the transparent object.

4. The scene rendering method according to claim 2, wherein the rendering the transparent object based on the second color texture copied with the first rendering result and the depth information of the transparent object, comprises:

determining first target depth information of the transparent object and second target depth information in the first rendering result, which respectively correspond to target pixel points, the target pixel points being pixel points to be rendered in the second color texture;

comparing the first target depth information with the second target depth information; and in a case where a depth of the first target depth information is greater than a depth of the second target depth information, not rendering the target pixel points.

5. The scene rendering method according to claim 1, wherein the copying the first rendering result onto the second color texture comprises:

creating a target map by taking the second rendering resolution as a reference, wherein color information of the target map corresponds to color information in the first rendering result; and rendering the target map based on the second color texture; and copying the color information in the first rendering result onto the second color texture.

6. The scene rendering method according to claim 1, wherein the performing first extraction on a color of the transparent object in the second rendering result, to obtain a third rendering result, comprises:

performing second extraction on the color of the transparent object in the second rendering result, to obtain color information of the transparent object; and performing first operation processing on the color information to obtain a processing result of the color information conforming to a target storage format, and obtaining the third rendering result, wherein the target storage format is a picture storage format; and wherein the synthesizing the third rendering result and the first rendering result comprises:

performing second operation processing on the color information in the third rendering result, to obtain target color information, wherein the second operation is an inverse operation of the first operation; and synthesizing the target color information and the color information in the first rendering result.

7. The scene rendering method according to claim 1, wherein the synthesizing the third rendering result and the first rendering result to obtain the rendered scene image, comprises:

processing an edge of the transparent object in the third rendering result by means of multiple sampling, to obtain a fourth rendering result; and synthesizing the fourth rendering result and the first rendering result to obtain the rendered scene image.

8. The scene rendering method according to claim 1, wherein the acquiring the opaque object and the transparent object in the scene to be rendered comprises:

acquiring a scene description file of the scene to be rendered;

parsing the scene description file, to acquire objects to be rendered in the scene to be rendered and rendering information corresponding to the objects to be rendered; and classifying the objects to be rendered according to the rendering information into an opaque object and a transparent object.

9. The scene rendering method according to claim 1, wherein the rendering the opaque object based on the first color texture to obtain the first rendering result, comprising:

rendering a pixel point only once.

10. The scene rendering method according to claim 1, wherein the rendering the opaque object based on the first color texture to obtain the first rendering result, comprising:

ranking the opaque object according to depth information of the opaque object; and sequentially rendering the opaque object according to the ranking of the opaque object.

11. An electronic device, comprising: a processor, a memory and a bus, the memory storing machine-readable instructions executable by the processor, the processor and the memory communicating over the bus when the electronic device is running, the machine-readable instructions, when executed by the processor, performing a scene rendering method comprising:

acquiring an opaque object and a transparent object in a scene to be rendered;

creating a first color texture with a first rendering resolution, and rendering the opaque object based on the first color texture to obtain a first rendering result;

creating a second color texture with a second rendering resolution and copying the first rendering result onto the second color texture, wherein the second rendering resolution is lower than the first rendering resolution, and the second rendering resolution is determined by at least one of a transparency of the transparent object or a number of laminations of the transparent object;

rendering the transparent object based on the second color texture copied with the first rendering result, to obtain a second rendering result;

performing first extraction on a color of the transparent object in the second rendering result, to obtain a third rendering result; and synthesizing the third rendering result and the first rendering result to obtain a rendered scene image, wherein the higher the transparency of the transparent object is, the lower the second rendering resolution is.

12. The electronic device according to claim 11, wherein:

the copying the first rendering result onto the second color texture comprises copying color information and depth information in the first rendering result onto the second color texture; and the rendering the transparent object based on the second color texture copied with the first rendering result comprises rendering the transparent object based on the second color texture copied with the first rendering result and the depth information of the transparent object.

13. A non-transitory computer-readable storage medium having a computer program stored thereon, which, when executed by a processor, performs a scene rendering method comprising:

acquiring an opaque object and a transparent object in a scene to be rendered;

creating a first color texture with a first rendering resolution, and rendering the opaque object based on the first color texture to obtain a first rendering result;

creating a second color texture with a second rendering resolution and copying the first rendering result onto the second color texture, wherein the second rendering resolution is lower than the first rendering resolution, and the second rendering resolution is determined by at least one of a transparency of the transparent object or a number of laminations of the transparent object;

rendering the transparent object based on the second color texture copied with the first rendering result, to obtain a second rendering result;

performing first extraction on a color of the transparent object in the second rendering result, to obtain a third rendering result; and synthesizing the third rendering result and the first rendering result to obtain a rendered scene image, wherein the higher the transparency of the transparent object is, the lower the second rendering resolution is.

14. The non-transitory computer-readable storage medium according to claim 13, wherein:

the copying the first rendering result onto the second color texture comprises copying color information and depth information in the first rendering result onto the second color texture; and the rendering the transparent object based on the second color texture copied with the first rendering result comprises rendering the transparent object based on the second color texture copied with the first rendering result and the depth information of the transparent object.

* * * * *